US011000942B1

(12) United States Patent
Meyer et al.

(10) Patent No.: US 11,000,942 B1
(45) Date of Patent: May 11, 2021

(54) ADJUSTABLE CLAMPING TOOL CLEVIS

(71) Applicants:Ronald G Meyer, Leawood, KS (US);
John L Rudder, Leavenworth, KS (US)

(72) Inventors: Ronald G Meyer, Leawood, KS (US);
John L Rudder, Leavenworth, KS (US)

(73) Assignee: Kraft Tool Company, Shawnee, KS (US)

( * ) Notice: Subject to any disclaimer, the term of this patent is extended or adjusted under 35 U.S.C. 154(b) by 576 days.

(21) Appl. No.: 15/883,535

(22) Filed: Jan. 30, 2018

Related U.S. Application Data

(60) Provisional application No. 62/453,738, filed on Feb. 2, 2017.

(51) Int. Cl.
*B25G 3/26* (2006.01)
*F16C 11/04* (2006.01)
*E04F 21/16* (2006.01)
*B08B 1/00* (2006.01)

(52) U.S. Cl.
CPC .............. *B25G 3/26* (2013.01); *F16C 11/04* (2013.01); *B08B 1/005* (2013.01); *E04F 21/16* (2013.01); *Y10T 403/32221* (2015.01)

(58) Field of Classification Search
CPC ..... Y10T 403/32221; Y10T 403/32918; E04F 21/244; E04F 21/16; E04F 21/161; B25G 3/26; B08B 1/005; F16C 11/04; F16C 11/045
See application file for complete search history.

(56) References Cited

U.S. PATENT DOCUMENTS

| | | | | |
|---|---|---|---|---|
| 606,148 A * | 6/1898 | Huntoon | ................. | F16C 11/04 |
| | | | | 403/79 |
| 872,903 A * | 12/1907 | Connely | ................ | E04B 1/2403 |
| | | | | 403/68 |
| 2,673,059 A * | 3/1954 | Lustig | .................... | B25H 1/005 |
| | | | | 248/316.7 |
| 2,763,517 A * | 9/1956 | Strand | ..................... | F16B 9/052 |
| | | | | 403/58 |
| 3,233,948 A * | 2/1966 | Gibson | ................. | E04F 21/161 |
| | | | | 403/146 |
| 3,798,701 A | 3/1974 | Irwin et al. | | |
| 3,847,488 A * | 11/1974 | Gossage | ................. | B66C 23/62 |
| | | | | 403/79 |
| 4,034,946 A * | 7/1977 | Zimmer, Jr. | ............ | F21V 21/30 |
| | | | | 248/183.2 |
| 4,155,141 A * | 5/1979 | Guerra | .................... | E01C 19/44 |
| | | | | 15/235.3 |
| 4,397,581 A | 8/1983 | Jarvis | | |

(Continued)

*Primary Examiner* — Matthew R McMahon
(74) *Attorney, Agent, or Firm* — Erickson Kernell IP, LLC; John C. McMahon

(57) ABSTRACT

An adjustable clamping tool clevis apparatus includes a clevis body having a clevis lug, with a clevis aperture, extending from a tool end of the body and an elongated handle receiver extending from a handle end of the body. A clamp lug with a clamp aperture is received on a fastener extending through the clevis lug and clamped against a tool lug of a concrete finishing tool to secure the tool at a selected angle to an elongated handle secured to the handle receiver. The clamp lug engages a surface of the clevis body to reinforce the connection of the apparatus to the tool.

21 Claims, 2 Drawing Sheets

(56) References Cited

U.S. PATENT DOCUMENTS

| | | | | |
|---|---|---|---|---|
| 4,520,527 | A | 6/1985 | Maggio et al. | |
| 5,115,536 | A * | 5/1992 | Jarvis | B25G 3/38 |
| | | | | 15/144.1 |
| 5,154,382 | A * | 10/1992 | Hoshino | F16C 11/103 |
| | | | | 248/185.1 |
| 7,156,577 | B1 * | 1/2007 | Rozinski | E01C 19/402 |
| | | | | 404/114 |
| 7,334,956 | B2 * | 2/2008 | Taylor | F16M 13/02 |
| | | | | 403/87 |
| 7,794,203 | B2 * | 9/2010 | Drelon | F01D 25/162 |
| | | | | 415/209.4 |
| 7,980,783 | B2 | 7/2011 | Jaszkowiak | |
| 9,278,752 | B2 * | 3/2016 | Osvog | F16C 27/02 |

\* cited by examiner

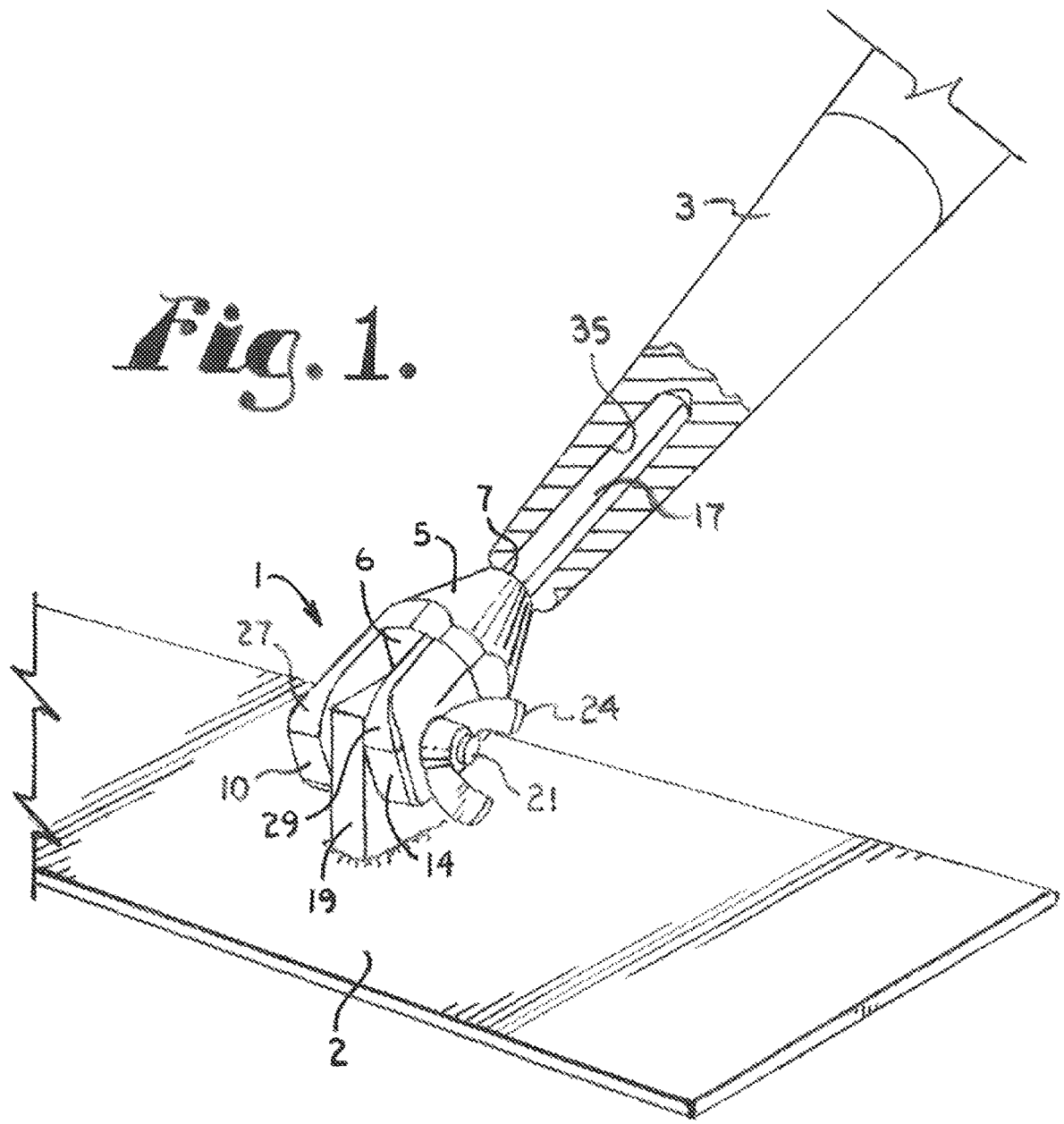

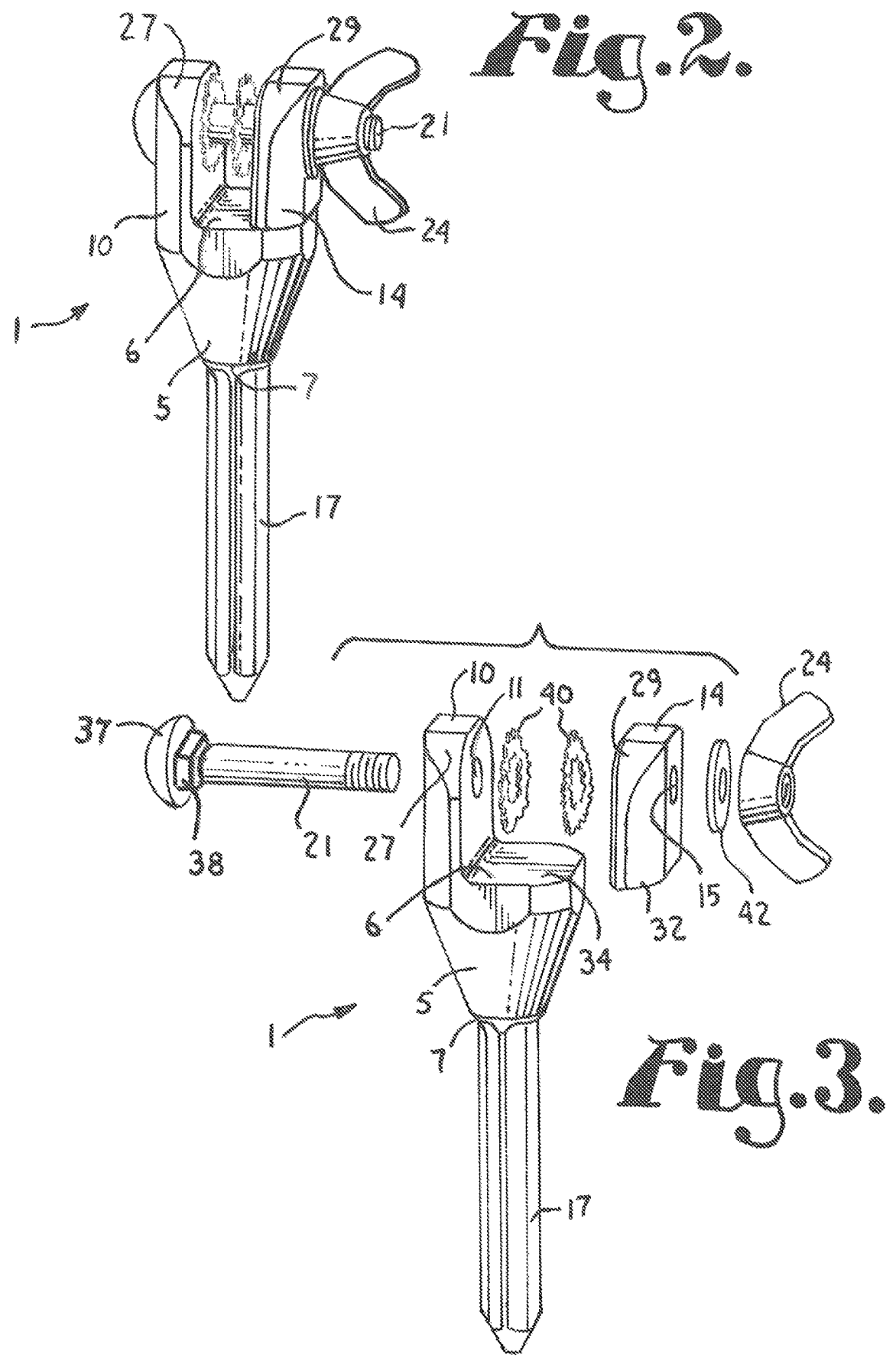

ADJUSTABLE CLAMPING TOOL CLEVIS

CROSS-REFERENCE TO RELATED APPLICATIONS

This application claims the benefit of U.S. Provisional Application Ser. No. 62/453,738, filed Feb. 2, 2017, which is incorporated by reference herein.

BACKGROUND OF THE INVENTION

The present invention is broadly concerned with improvements in concrete finishing tools and, more particularly, to an improved tool clevis for adjustably connecting a concrete finishing tool to a tool handle.

After pouring concrete into a set of forms to form a generally horizontal slab, the first step in finishing the upper surface is screeding with a screed tool to bring the upper surface to the required grade and initial degree of smoothness. Afterwards, further smoothing and surface compacting is achieved using a concrete float.

A concrete float is a flat, elongated board or plank which is passed across the concrete surface to level ridges, fill voids, and smooth the surface in preparation for troweling. For floating relatively large slabs of concrete, the float may have a long handle attached to enable reaching all parts of the slab without stepping onto the slab. A float with a long handle is often referred to as a "bull" float.

A concrete finisher may make several passes with a float over the concrete surface as the concrete cures, with the blade pitch being specially selected for each pass. In the initial pass, when the concrete is still very wet and plastic, the blade pitch is usually adjusted to be substantially parallel with the concrete surface, thereby lying flat upon it and spreading the weight of the float over a maximum surface area. In subsequent passes, as the concrete cures and becomes less plastic, the blade pitch may be progressively increased. Because it is desirable to control the pitch of the float relative to the concrete surface, it is desirable to fix the angular relationship between the float and the handle during use, but the handle may be repositioned at whatever angle to the tool that is needed.

On some float arrangements, the handle has a single handle lug while the tool has a single tool lug, each with respective apertures. A threaded fastener, such as a bolt, passes through the apertures of the lugs, and a nut is threaded onto the fastener and tightened to retain the angular relationship between the handle and the float. Friction between the lugs and between the lugs and the fastener components prevents slippage of the joint, if the nut is tightened sufficiently. On some float arrangements, the mating surfaces of the handle and tool lugs have radial ribs or serrations which mesh to prevent slippage of the angle between the handle and the float. A problem with such ribs is that the fineness of angular adjustment between the handle and the float is undesirably reduced.

SUMMARY OF THE INVENTION

The present invention provides embodiments of an improved apparatus for connecting a concrete finishing tool to a handle.

An embodiment of a tool clevis apparatus for connection of a tool handle to a tool, according to the present invention, comprises: a clevis body having a handle end and an opposite tool end; a handle receiver positioned on or extending from the handle end of the clevis body to receive a handle member; a fixed clevis lug extending from the tool end of the clevis body, the fixed lug having a clevis aperture formed therethrough; a clamp lug having a clamp aperture formed therethrough; a threaded fastener extending through the clevis aperture of the fixed lug and the clamp aperture of the clamp lug; and a nut threaded on the fastener to clampingly urge the clamp lug toward the fixed lug.

In an embodiment of the apparatus, the tool has a tool lug which is positioned and clamped between the fixed lug and the clamp lug to releasably secure the tool to the handle in a selected angular relation. The clamp lug may have an outer shape which is substantially similar to the outer shape of the fixed lug whereby the apparatus, when assembled, has the appearance of a clevis with two fixed lugs.

In an embodiment of the tool clevis apparatus, the clevis body has a clevis body surface at the tool end thereof, while the clamp lug has a clamp lug surface. The clevis body surface and the clamp lug surfaces are of such respective configurations that engagement of the clamp lug surface with the clevis body surface prevents rotation of the clamp lug relative to the fixed lug when the clamp lug is clampingly urged toward the fixed lug. The clevis body surface and the clamp lug surface may, for example, be flat.

The apparatus may incorporate a lock washer, or a pair thereof, to increase friction between the fixed lug and the tool lug, between the clamp lug and the tool lug, or both. The nut may be a wingnut to facilitate assembly of the apparatus without tools, such as a wrench. The handle receiver may include an elongated rod extending from the handle end of the clevis body which is axially received into an end of an elongated tool handle. It is foreseen that a fastener or a clamping element may be employed to positively retain the rod within the handle.

An embodiment of the present invention includes the tool clevis apparatus as described above in combination with a tool handle member secured to the handle end of the clevis body and a tool having a tool lug clamped between the fixed lug and the clamp lug. The tool may be a concrete finishing tool such as a concrete finishing float.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is a fragmentary perspective view of an embodiment of an adjustable clamping tool clevis apparatus according to the present invention, shown connecting a tool handle to a tool.

FIG. 2 is a somewhat enlarged perspective view showing the tool clevis apparatus.

FIG. 3 is an exploded perspective view of the tool clevis apparatus illustrating the component parts thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of an improved apparatus for connecting a tool 2 to a tool handle 3 and, more particularly, an adjustable clamping tool clevis apparatus.

The illustrated apparatus 1 includes a clevis body 5 having a clevis or tool end 6 and a handle end 7. The clevis end 6 of the clevis body 5 has a fixed or clevis tool connector lug 10 extending from one side thereof. The clevis lug 10 has a clevis lug aperture 11 (FIG. 3) formed therethrough. The apparatus 1 includes a clamp lug 14 having clamp lug aperture 15 (FIG. 3) formed therethrough. On the handle end 7, the clevis body 5 has an elongated handle receiver 17, illustrated as a rod or spike extending axially from the clevis body 5. The tool handle 3, such as an elongated pole, has the handle receiver 17 embedded therein. The clevis body 5 may be tapered toward the handle receiver 17.

The tool 2 is illustrated as an elongated, flat concrete finishing tool, such as a float. The tool 2 has a tool lug 19 (FIG. 1) extending from an upper surface thereof. The tool lug 19 has a tool lug aperture (not shown) formed therethrough which may be aligned with the clevis lug aperture 11 and the clamp lug 15 to receive a fastener 21, such as a threaded bolt, to secure the apparatus 1, and the handle 3 therewith, to the tool 2. The bolt 21 has a nut 24 threaded thereon to urge the clamp lug 14 toward the tool lug 19 and the clevis lug 10 to thereby clamp the tool lug 19 between the clevis lug 10 and the clamp lug 14 to secure the tool 2 and handle 3 in a desired angular relationship.

The illustrated clevis lug 10 has a somewhat "relieved" shape on an outer end thereof, formed by curved areas 27 formed thereon. The clamp lug 14 has curved areas 29 on the outer end thereof giving the clamp lug an outer shape which is substantially similar to the shape of the outer end of the clevis lug 10. An inner end of the clamp lug 14 has a clamp lug surface 32 which cooperates with a clevis body surface 34 (FIG. 3) of the clevis body 5 which are cooperatively shaped to resist rotation of the clamp lug 14 when clamped against the tool lug 19. The illustrated clamp lug surface 32 and the illustrated clevis body surface 34 are flat. When the clamp lug 14 is tightly clamped against the tool lug 19, engagement of the clamp lug surface 32 with the clevis body surface 34 braces or reinforces the joint between the clevis lug 10 and the tool lug 19 to resist undesired loosening of the joint. The combination of the clevis lug 10 and the clamp lug 14 gives the apparatus 1 the appearance of a clevis joint.

The handle 3 is typically a long pole or tube and may have a length on the order of ten feet (about three meters) or longer and may be made from aluminum, wood, polymers, or the like. The handle 3 may have a socket 35 to receive the handle receiver 17 which has a non-round cross-sectional shape. Preferably, the receiver 17 is elongated and has a non-round cross-sectional shape which cooperates with the shape of the socket 35 to prevent relative rotation between the apparatus 1 and the handle 3 about longitudinal axes of the receiver 17 and the handle 3. The receiver 17 may be pointed on an upper end and may be retained within the socket 35 by friction. Alternatively, the receiver 17 may be retained by one or more fasteners such as set screws (not shown), a clamp mechanism (not shown), or the like.

The illustrated fastener or bolt 21 is a square neck round head bolt, also referred to as a square neck carriage bolt or, simply, a carriage bolt. It has a round head 37 (FIG. 3) with a square neck 38 formed immediately below the head 37. The neck 38 fits into a complementary recess (not shown) formed in the outer lateral surface of the clevis lug 10 about the aperture 11. Engagement of the neck 38 with the recess prevents the bolt 21 from rotating as the nut 24 is threaded thereon and, thus, facilitates installation of the nut 24 without the use of a tool. The apparatus 1 may include lock washers 40 positioned respectively between the clevis lug 10 and the tool lug 19 and between the tool lug 19 and the clamp lug 14. The illustrated lock washers 40 are toothed lock washers which increase friction between the lugs 10 and 14 and the lug 19 to prevent undesired loosening of the joint when the nut 24 is tightened. The apparatus 1 may also include a washer 42 positioned between the clamp lug 42 and the nut 24 to spread the clamping load of the nut 24 on the lug 14 and to prevent frictional wear on the lug 14 by the nut 24. The nut 24 is preferably a wingnut to facilitate tightening of the nut 24 without the use of a tool to secure the tool handle 3 to the finishing tool 2 at a desired angle.

It is to be understood that while certain forms of the present invention have been described and illustrated herein, it is not to be limited to the specific forms or arrangement of parts described and shown.

What is claimed and desired to be secured by Letters Patent is:

1. A tool clevis apparatus for connection of a tool handle to a tool and comprising:
    (a) a clevis body having a handle end and a tool end;
    (b) a handle receiver positioned on the handle end of the clevis body to receive a handle member;
    (c) the clevis body having an outwardly facing clevis body surface; the clevis body surface being substantially flat; a fixed clevis lug extending outwardly from the tool end of the clevis body and from one side of the clevis body surface, the fixed lug having a clevis aperture formed therethrough;
    (d) a clamp lug having a clamp aperture formed therethrough; the clamp lug having a substantially flat clevis body facing clamp lug surface that is sized and shaped to engage and slide along the clevis body surface on a side of the clevis body surface opposite the fixed clevis lug such that the clamp lug surface is slidably engaged with the clevis body surface and spaced from the fixed clevis lug;
    (e) a threaded fastener extending through the clevis aperture of the fixed lug and the clamp aperture of the clamp lug; and
    (f) a nut threaded on the fastener to clampingly urge the clamp lug toward the fixed lug.

2. An apparatus as set forth in claim 1 wherein the tool has a tool lug extending therefrom, the tool lug having a tool lug aperture, and wherein:
    (a) the tool lug is positioned between the fixed lug and the clamp lug with the fastener extending through the tool lug aperture whereby the tool lug is clamped between the fixed lug and the clamp lug when the clamp lug is clampingly urged toward the fixed lug to thereby releasably secure a tool having such a tool lug to a handle member in a selected angular relation.

3. An apparatus as set forth in claim 1 wherein:
    (a) the clevis body surface and the clamp lug surface being of such respective configurations that engagement of the clamp lug surface with the clevis body surface prevents rotation of the clamp lug relative to the fixed lug when the clamp lug is clampingly urged toward the fixed lug.

4. An apparatus as set forth in claim 1 and including:
(a) a lock washer with a washer aperture positioned between the fixed lug and the clamp lug with the fastener extending through the washer aperture thereof.

5. An apparatus as set forth in claim 1 wherein the handle receiver includes:
(a) an elongated rod extending from the handle end of the clevis body, the rod being axially received into an end of an elongated tool handle.

6. An apparatus as set forth in claim 1 wherein:
(a) the nut is a wingnut.

7. An apparatus as set forth in claim 1 wherein:
(a) the clamp lug has an outer shape substantially similar to an outer shape of the fixed lug and whereby removal of the clamp lug from engagement with the clevis body leaves the side of the clevis body fully open to access thereof to the entire clevis body surface.

8. An apparatus as set forth in claim 1 in combination with:
(a) a tool handle member secured to the handle end of the clevis body;
(b) a tool having a tool lug clamped between the fixed lug and the clamp lug.

9. An apparatus as set forth in claim 8 wherein:
(a) the tool is a concrete finishing tool.

10. A tool clevis apparatus in combination with a handle and a tool for connection of the handle to the tool having a tool lug with a tool lug aperture, the apparatus comprising:
(a) a clevis body having a handle end and a tool end;
(b) a handle receiver extending from the handle end of the clevis body to receive the handle;
(c) the clevis body having an outwardly facing clevis body surface; the clevis body surface being substantially flat a fixed clevis lug extending from the tool end of the clevis body and adjacent to the clevis body surface on a first side of the clevis body surface; the fixed lug having a clevis aperture formed therethrough;
(d) a clamp lug having a clamp aperture formed therethrough; the clamp lug having a substantially flat surface that is sized and shaped to mate with and slide along the clevis body surface on a second side of the clevis body surface opposite the fixed clevis lug such that the clamp lug surface is engaged with and slidable along the clevis body surface and spaced from the fixed clevis lug during use;
(e) the tool lug is positioned between the fixed lug and the clamp lug;
(f) a threaded fastener extending through the clevis aperture of the fixed lug, the clamp aperture of the clamp lug, and the tool lug aperture of the tool lug; and
(g) a nut threaded on the fastener to clampingly urge the clamp lug toward the fixed lug to clamp the tool lug thereby between to thereby releasably secure a tool having such a lug to a handle member in a selected angular relation.

11. An apparatus as set forth in claim 10 wherein:
(a) engagement of the clamp lug surface with the clevis body surface prevents rotation of the clamp lug relative to the fixed lug when the clamp lug is clampingly urged toward the fixed lug.

12. An apparatus as set forth in claim 10 and including:
(a) a lock washer with a washer aperture positioned between the tool lug and at least one of the fixed lug and the clamp lug with the fastener extending through the washer aperture thereof.

13. An apparatus as set forth in claim 10 and including:
(a) a respective lock washer with a washer aperture positioned between the tool lug and each of the fixed lug and the clamp lug with the fastener extending through the washer aperture thereof.

14. An apparatus as set forth in claim 10 wherein the handle receiver includes:
(a) an elongated rod extending from the handle end of the clevis body, the rod being axially received into an end of an elongated tool handle member.

15. An apparatus as set forth in claim 10 wherein:
(a) the nut is a wingnut.

16. A tool clevis apparatus in combination with a handle and a tool having a tool lug with a tool lug aperture adapted for use in connecting the handle to the tool, the apparatus comprising:
(a) a clevis body having a handle end and a tool end, the clevis body having an outwardly facing substantially flat clevis body surface at the tool end thereof;
(b) a handle receiver extending from the handle end of the clevis body to receive a handle member;
(c) a fixed clevis lug extending outward from the tool end of the clevis body and in engagement with the clevis body surface, the fixed lug having a clevis aperture formed therethrough;
(d) a clamp lug being located opposite the fixed clevis lug during use of the apparatus and having a clamp aperture formed therethrough, the clamp lug having a clamp lug surface, the clevis body surface and the clamp lug surface being of such respective configurations that during use the clamp lug surface slidingly engages the clevis body surface preventing rotation of the clamp lug relative to the fixed lug; the clamp lug being fully removable from the clevis body to allow access to the clevis body surface;
(e) the tool lug being positioned between the fixed lug and the clamp lug during use of the apparatus;
(f) a threaded fastener extending through the clevis aperture of the fixed lug, the clamp aperture of the clamp lug, and the tool lug aperture of the tool lug; and
(g) a nut threaded on the fastener to clampingly urge the clamp while sliding on the clevis body surface lug toward the fixed lug to clamp the tool lug therebetween and to engage the clamp lug surface with the clevis body surface to thereby releasably secure a tool having such a tool lug to a handle member in a selected angular relation.

17. An apparatus as set forth in claim 16 and including:
(a) a lock washer with a washer aperture positioned between the tool lug and at least one of the fixed lug and the clamp lug with the fastener extending through the washer aperture thereof.

18. An apparatus as set forth in claim 16 and including:
(a) a respective lock washer with a washer aperture positioned between the tool lug and each of the fixed lug and the clamp lug with the fastener extending through the washer aperture thereof.

19. An apparatus as set forth in claim 16 wherein the handle receiver includes:
(a) an elongated rod extending from the handle end of the clevis body, the rod being axially received into an end of an elongated tool handle member.

20. An apparatus as set forth in claim 16 wherein:
(a) the nut is a wingnut.

21. An apparatus as set forth in claim 16 wherein:
(a) the tool is a concrete finishing tool.

\* \* \* \* \*